Nov. 4, 1941.    W. HECHT    2,261,368
METHOD OF TREATING PLANTS TO PRODUCE ARTIFICIAL OR ABNORMAL GROWTHS
Filed April 29, 1938    2 Sheets-Sheet 1
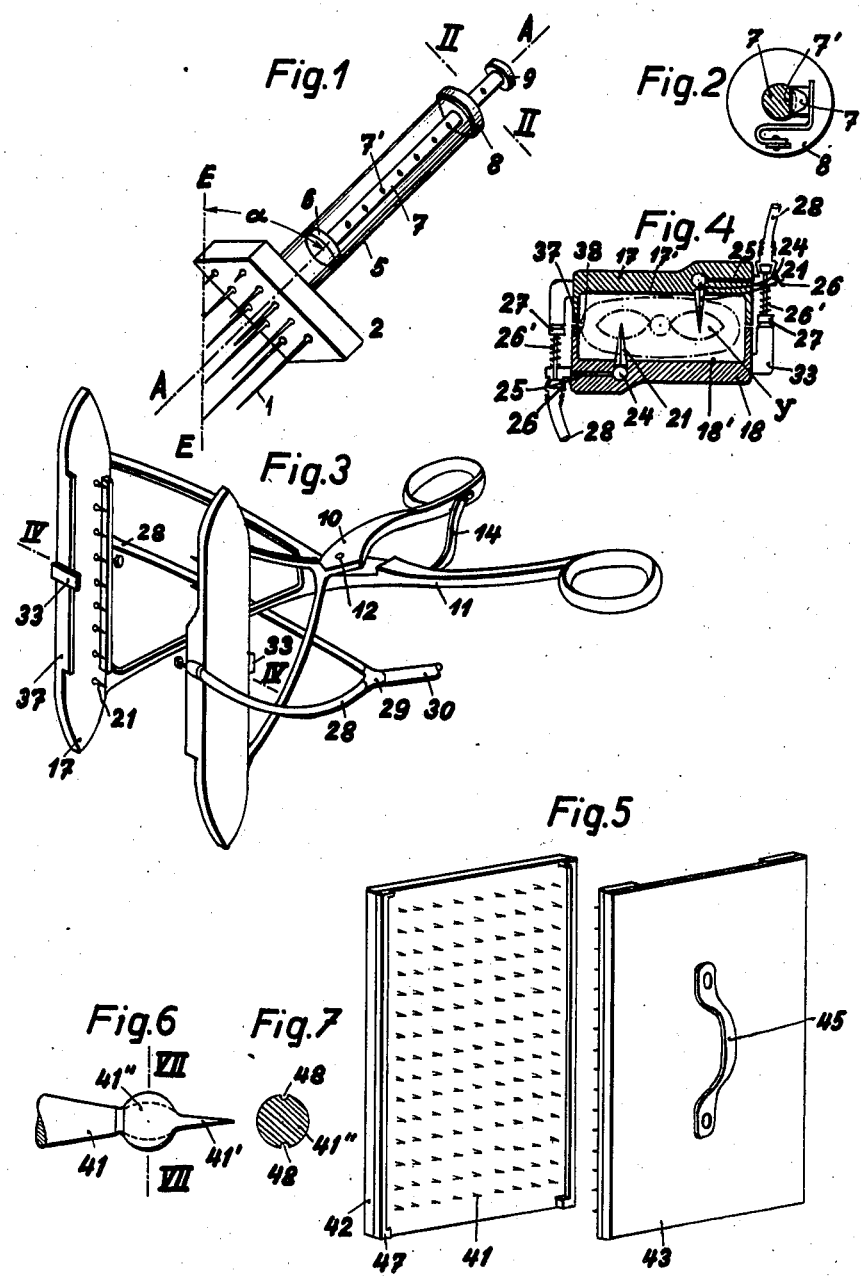
INVENTOR
WALTER HECHT
BY
Dowell+Dowell
ATTORNEYS.

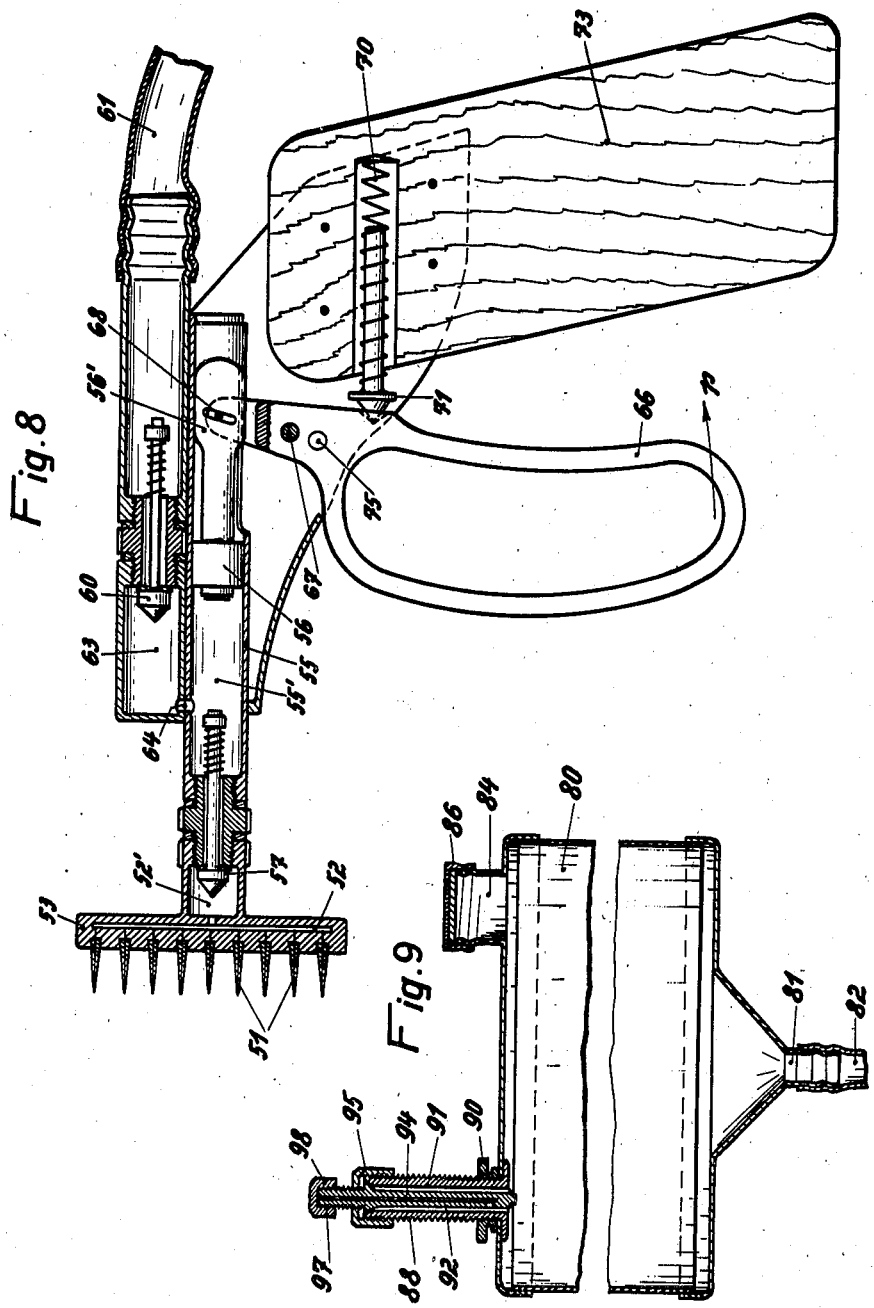

Patented Nov. 4, 1941

2,261,368

UNITED STATES PATENT OFFICE 2,261,368

METHOD OF TREATING PLANTS TO PRODUCE ARTIFICIAL OR ABNORMAL GROWTHS

Walter Hecht, Vienna, Germany

Application April 29, 1938, Serial No. 205,104
In Austria April 30, 1937

7 Claims. (Cl. 47—57.5)

This invention relates to artificial fertilizing and/or infecting of plants to produce growths abnormal thereto.

The invention has for its object the production of artificial or abnormal growths, such as fruits, parasites, symbiotic organisms and the like on living plants, said growths being adapted for use for nutritive and technical purposes, as for instance in or for the production of pharmaceutical goods.

In order to secure a field or acreage production of such growths upon a large scale, according to the invention, germ-carrying liquids are introduced into the tissues of living plants by puncturing the same with or by the aid of needles.

The expedient of puncturing plants and introducing germ-carrying liquids thereinto is of course already broadly known. In the various known methods of the prior art the puncturing is done generally on dead plants, or dead parts of plants, for the purpose or with the view of dyeing (coloring) and preserving the same. Also living plants, i. e. sugar-cane for instance, have been punctured with an introduction of germ-carrying liquids. This known procedure has served for the scientific examination of such plants for the purpose of determining their resistance against diseases.

As distinguished from these prior methods or practices, the present invention has for its special object the production of artificial growths on common living plants under regular or ordinary field production conditions. In this is contemplated the production of growths used for technical, and more especially for pharmaceutical purposes, i. e. ergot on rye. It is further contemplated to produce new fruits, grains or the like through hybridizing in a systematic and rational way.

The main advantage of the present method is that the germinal matter can be introduced at the desired place or spot into the interior of the tissue by the puncturing or pricking operation. This greatly increases the reliability with which the desired effect is achieved. Furthermore, the time available for the practicing of the method is very considerably longer and often many times as long as in the case of prior known methods, since fertilization may be effected before the blossom develops or opens. This means that the castration otherwise necessary may in many cases be dispensed with. The invention also brings with it the further advantage that the consumption of germinal matter is extremely small, so that the method is highly economical. Thus, in spite of a very low consumption of the germinal matter used, the reliability with which the desired result is achieved is very greatly increased. The advantages are particularly great in connection with breeding and cross-breeding work the results of which often become apparent only after years.

Several different forms of construction of devices for carrying out the method according to the invention are shown, by way of example, in the accompanying drawings, in which:

Fig. 1 is a perspective view of one constructional form of the device according to the invention.

Fig. 2 is a section taken on the line II—II of Fig. 1, on an enlarged scale.

Fig. 3 shows, in perspective view, a second form of construction of the device according to the invention.

Fig. 4 is a section taken on the line IV—IV of Fig. 3.

Fig. 5 shows in perspective view a third form of construction of the device according to the invention.

Fig. 6 shows the puncturing means employed in the form of construction shown in Fig. 5.

Fig. 7 is a section taken on the line VII—VII of Fig. 6.

Fig. 8 shows in longitudinal section a modified form of construction of the device according to the invention; and Fig. 9 shows in longitudinal section a form of construction of the storage container.

The method according to the invention is practiced in principle as follows: the operator passes from plant to plant in the breeding ground (field, garden, or green-house) and introduces the germinal matter as required into the plants to be treated, the plants which are not to be treated being left alone. If it is desired to effect artificial fertilization, germinal matter is introduced into as many blossoms as it is intended to fertilize. In order to obtain artificial parasitism the injecting is effected into the tissue to be infected or into neighbouring tissue intended to serve as a focus of infection.

As already mentioned, fertilization with germs of the same species or with germs of a different species may be effected by the method according to the invention, and it is equally possible with the aid of this method to establish immunity to the attacks of fungus, and also to produce parasitic growth, such as galls and the like, which may have practical usefulness outside the field of botany. With the aid of the present invention it is also possible to promote the production of mycorhiza the symbiosis of which constitutes a precondition for the germination of many plants, for instance orchids.

A particular advantage of the invention resides in the possibility of introducing the germinal matter into the plant simultaneously at several points, which may be effected with the aid of the devices to be described in due course hereinafter. The result of this possibility is that in the first place the probability of the germinal matter actually reaching the tissue to be fertilized or infected is increased, and therefore the chances of fertilization or infection being effected become greater, while in the second place it becomes possible to perform fertilization or infection at several points in the tissue simultaneously, so that the yield is increased while the amount of work involved is decreased.

In further development of the invention there may be used for the introduction of the germinal matter, in place of injecting syringes, puncturing or pricking means which are wetted with the germ-carrying liquid. For this purpose there may be used ordinary needles or prickers having grooves, channels, or the like in which a certain quantity of the germ-carrying liquid can become lodged or through which it may pass. For this purpose thickening agents, such as for example malt extract, mucilage, or the like, may be added to the germinal liquid to cause a larger quantity of this liquid to adhere to the pricking means. To render the treated plants recognizable a harmless coloring matter, such for instance as methyl orange, may also be added to the germinal material used.

Together with the germinal liquid there may also be introduced into the plants various other substances capable of exerting a biochemical action upon the development of the plant and the composition of the constituent substances, whether by having a promoting effect upon development or by having an inhibitory effect upon the development of undesirable constituents. For this purpose there may be employed for example so-called organic growing principles, e. g., auxines, as also the known nutrient solutions which are mainly of an inorganic nature. Inorganic catalysts, such as for instance copper and manganese salts, may also be introduced. For the purpose of checking the development of certain undesired processes stabilizing agents have proved efficacious, an example of such agents being thymol.

A further possibility of promoting plant metabolism consists in introducing dyestuffs which bring about a selection of the light absorbed by the plant. Thus for example by introducing a yellow-green dyestuff there may be effected an increase in the absorption of the short-wave portion of the spectrum which is particularly active chemically.

All the above-mentioned substances can be incorporated into the plant in the form of admixtures to the germ-carrying liquid, either by introduction into the tissue thereof by puncture or by wetting the plant therewith.

The present method may be used both for artificial fertilization, in which spores of the same species are introduced into the plant, and also for artificial infection in which foreign spores are introduced, for the purpose of cross-breeding or of producing parasites. With the aid of this method for example rye may be infected with ergot spores for the purpose of obtaining an increase yield of the pharmaceutically valuable ergot principle.

For the purpose of artificial fertilization, in the case of flowering plants, the procedure according to the invention is to obtain pollen from the stamen and to suspend the same in a suitable solution, e. g., a cane sugar solution. This solution is then introduced into the plant with the aid of an injecting syringe or of a needle, or with the aid of one of the instruments equipped with pricking means shown in the drawings, by puncturing the plant. If the puncture is made into the ovary itself the pollen finds its way directly into the interior thereof (the embryonal sac), there forces the pollen duct, and carries out the normal fertilization. If on the other hand the germ-carrying liquid is introduced into the cavity of the blossom the pollen duct grows in the normal way through the stigma into the interior of the embryonic sac.

In this manner ornamental plants such as tulips, vegetable plants such as tomatoes, fruit plants such as apples and pears, and useful plants such as cereals may be advantageously and very reliably fertilized, and breeding and large scale fertilization carried out extremely economically. In many cases the troublesome castrating of the plants may be dispensed with and the desired result nevertheless achieved, namely the fertilizing of a certain ovary with a certain kind of pollen. A further use of the method is in ascertaining individuals of a certain kind of plant which are particularly resistant to certain fungoid pests, as explained in Example 2 hereinafter.

*Examples*

*Example No. 1.*—To infect rye with ergot the procedure may be as follows:

The mycelium (fungoidal tissue) obtained from sclerotium (ergot in its durable form) is propagated for several weeks in a nutrient solution, e. g., of malt extract. The solution permeated by the fungoid tissue is passed through a hair sieve and the fungoid tissue thereby comminuted. The cells are then diluted with solutions of malt extract and the like.

These dilute solutions are directly sprayed into the ears of rye at any time between the commencement of development and the time of flowering, for instance with the aid of multiple injection syringes as shown in Figs. 1 to 3. It is not necessary for each individual haulm to be treated, but haulms selected according to a certain plan, e. g., every third or fifth will be sufficient.

As a result of this infection the formation of honey-dew takes place after about six days. From this honey-dew the ergot is evolved in the course of a further two to three weeks. In addition, transmission of the honey-dew to the neighbouring flowering ears takes place in a natural way, resulting in the formation of further quantities of ergot; this natural secondary infection may be promoted in accordance with the invention by moving the plants, e. g., by brushing over the ears with a cloth. A further possibility of promoting secondary infection is to sprinkle the plants with liquids which attract insects, e. g., liquids containing sugar. When the grain is golden ripe the ergot is completely formed, and can then be harvested, partly by hand picking and partly by screening in the course of threshing.

By the described method I have succeeded, in a number of large scale practical tests, in obtaining in an economical manner ergot having a high percentage of effective principles.

*Example No. 2.*—To breed a kind of plants, such for instance as peppermint plants, which is or are particularly resistant to fungoid disease, it is necessary to start from individuals which are by nature unusually resistant, and then to breed therefrom with a view to obtaining immunity.

The following is a particularly effective and easy way of ascertaining such individuals.

Blight spores (*Puccinia menthae*) are obtained from plants afflicted with blight, and are introduced into the plants to be tested for their resistance to this blight. The plants can then be divided into groups graded according to their powers of resistance, judging by the rapidity and extent to which they fall a prey to the blight. The immune or least attacked plants are then taken to breed from.

Devices particularly well suited for carrying out the method according to the invention are shown in the accompanying drawings, and will now be described in detail.

In the form of construction shown in Figs. 1 and 2 the germinal matter is introduced into the tissue of the plants treated at a number of points simultaneously. The device is furnished with a plurality of puncturing elements 1 in the form of hollow needles. These puncturing needles 1 are interchangeably mounted communicatively in a hollow distributer 2 the cavity of which communicates with a cylinder 5. In the cylinder 5 there is provided a contrivance for compressing and pumping the germ-carrying liquid, which contrivance consists of a plunger 6, the rod 7 of which is passed through the cap 8 and furnished with a push-knob 9. The cylinder 5 at the same time forms a handle for gripping and holding the device. For ease of handling and puncturing there are provided needles 1 of different lengths; the tips of these needles lie in a plane E—E which is inclined at an angle (e. g. 45°) to the longitudinal axis A—A of the syringe 5—9. For the purpose of controlling the quantity of liquid introduced into the plant there are provided means 7′, 7″ for limiting the movement or stroke of the plunger. In the present instance these means consist of notches 7′ in the plunger rod 7, and a springstressed catch 7″ which is adapted to snap into these notches one after the other as the plunger is moved in the cylinder of the syringe. In use the needles 1 are driven into the plant obliquely downwards, after which the germ-carrying liquid is driven in by pressing in the plunger.

The device shown in Figs. 3 and 4 is an implement in the form of a pair of tongs. The two halves 10, 11 are actuatively pivoted to each other by means of a joint pin 12. A spring 14 tends to force the two halves 10, 11 away from each other. The two halves of the implement are equipped with opposed side plates or cheeks 17, 18 which in the first place carry the pricking means in the form of hollow puncturing needles 21, and in the second place are designed to provide a counter-support for taking up the thrust involved in effecting the puncturing. The puncturing needles 21 are provided on the opposite faces of the two cheeks 17, 18 (see Fig. 4) in rows offset in relation to each other. The inner surfaces 17′, 18′ opposite the pricking needles 21 constitute the counter-supports against which the plant *y* bears while the puncturing is being effected.

The interchangeably mounted needles of each row, or rather the respective rows thereof communicate each with a distributing passage 24 which is connected through a bore 25 and control means 26 with a feed pipe 28. The feed pipes 28 are united in a Y at 29 and communicate through a conduit 30 with a supply container (not shown in the drawing) for the germ-carrying liquid. This storage container is disposed at a certain level so that the germinal liquid enters the pricking needles 21 at a certain pressure due to the head of liquid. The storage container may be carried for instance on the chest or on the back of the person using the instrument.

The control means 26 consists in the present instance of a valve normally kept closed by a spring 26′. The head 27 of the valve stem coacts with a stop 33 provided on the opposite cheek. As long as the cheeks are held apart the valves 26 are kept closed by their springs 26′.

In use the device shown in Figs. 3 and 4 is applied in open position over the plant so that the part of the plant on which the infecting operation is to be performed will be situated between the cheeks. The cheeks are then closed on the plant in the manner of tongs, with the result that the needles 21 are driven into the plant *y* which is supported against the surfaces 17′ and 18′. Before the cheeks come completely together the stops 33 strike against the valve stem ends 27 causing the valves 26 to be opened. Communication is thereby established between the storage vessel and the hollow pricking needles, with the result that the germ-carrying liquid enters the plant *y* through the needles at a pressure determined by the column of liquid in the system, that is to say by the height of the storage container above the instrument. In the fully closed conditions the cheeks 17 and 18 bear against each other by means of the stops 37, 38. These stops 37, 38 take the form of lateral rims which together with the cheeks 17 and 18 form a receiving chamber or compartment of double U-shaped cross-section for the plant *y* under treatment (Fig. 4).

With the forms of construction shown in Figs. 1, 2, and in Figs. 3, 4 the germinal liquid is introduced into the plant tissue with the aid or through the medium of hollow puncturing needles. The introduction of the germinal liquid may, however, also be carried out in other ways, e. g. as shown in Figs. 5–7, by pricking the plant with pricking means wetted with the germinal liquid. For this purpose the pricking means 41 (see Figs. 5 and 6) are disposed in a number of longitudinal and transverse rows on two carrying members 42, 43 which are plate-shaped and each provided with a handle 45. To prevent squashing of the plant between the plates 42, 43 there are provided stops 47, e. g. in the form of ledges or rims.

The pricking means 41 may be variously constructed, the only essential requirement being that they be able to receive and retain the requisite quantity of the germinal liquid used. In the form of construction shown in Figs. 6 and 7 the pricking means 41 consist of a prong with a tip 41′, and enlarged head 41″, and longitudinal grooves 48 on the periphery of the latter for the reception and retention of the requisite quantity of the liquid to be used in treating the plants.

In using the device shown in Figs. 5–7 the prongs 41 are dipped into the germinal liquid.

When taken out of this liquid a certain quantity of the latter is retained in the grooves 48. The two plate-shaped members 42, 43 with the wetted prongs 41 are then moved towards each other over the plant to be treated, whereby the plant is pricked. When the plates are moved apart again the liquid lodged in the grooves 48 is wiped off and left behind in the plant. Thus the liquid is adapted to be injected into the plant around, instead of through, the needles.

In the form of construction shown in Fig. 8 51 denotes the pricking means consisting of hollow needles, while 52 denotes a distributing passage in a head plate 53. This pricking means fitting is interchangeably mounted on the one end of a cylinder 55 which together with the plunger 56 constitutes a pump, the output of which at each stroke represents the quantity of liquid required for charging the pricking means with one charge. The working space 55′ of this pump communicates around a pressure valve 57 with an antechamber 52′ leading to the distributing passage 52. A suction valve 60 of the pump is situated between the feed pipe 61 leading from the supply vessel and a chamber 63 which communicates through an aperture 64 with the working space 55′ of the pump. The cubic content capacity of the chamber 63 preferably corresponds to a multiple of the quantity of liquid delivered at each working stroke of the pump. In the chamber 63 there is thus always a certain excess of liquid which ensures continuous working of the device in the event of a disturbance in the feed from the storage vessel.

To operate the plunger 56 there is provided an actuating member 66 of which 67 is the pivot or axis of rotation. At 68 the short lever arm of the actuating member is connected with the rod 56′ that connects to the pump plunger 56. 70 denotes a spring which resiliently holds the handle 66 and the plunger 56 in the position shown in Fig. 8. The spring 70 with the pin 71 is mounted in a handle 73.

As will be seen from Fig. 8, the device is in the form of a pistol with a butt handle 73, a trigger-like actuating member 66, and a distributer 52 with pricking means 51 mounted at the forward end of the barrel 55. If the chamber 63 and the cylinder or barrel 55 are charged with the germinal liquid and the device is directed against the plant in such a way that the needles 51 are inserted into the tissues of the plant to be treated, then actuation of the actuating member 66 in the direction of the arrow *p*, towards the handle 73 (like pulling the trigger of a pistol), will cause the plunger 56 to displace the quantity of liquid required for a single charging of the needles 51 and thereby press the germinal liquid into the tissue of the plant. When the operating member 66 is released, the tensioned spring 70 effects the return movement of the parts 66, 56 into the position shown in Fig. 8. During this movement of the plunger liquid is drawn up into the chamber 63 through the open suction valve 60 from the pipe 61 and the storage container. To enable the quantity of liquid drawn in and delivered to be regulated there are provided adjusting means 75. These means consist of one or more holes disposed at varying distances from the pivot point 68. By changing the position of the pin 67 from one to the other of these holes, the ratio between the lever arms of the operating member may be altered in a simple manner.

The device according to the invention is simple and reliable in construction, is convenient to hold in the hand, and enables the work of pricking and infecting of the plants to be effected rapidly and with entire accuracy of aim. The user's second hand is available for grasping and holding a suitable counter-support which is preferably in the form of a pad.

In the case of pricking devices in which the germinal liquid is fed from a storage container, the latter may be equipped with means for putting the contents under pressure, for the purpose of ensuring continuous and steady flow of the feed. Such a provision is shown in Fig. 9, wherein 80 represents the storage tank, which may be made for example of sheet metal, while 81 is the outlet branch for the attachment of a hose pipe 82 leading to the pricking device. In the cover of the container there is provided a filling nozzle or neck 84 adapted to be closed by means of a cap 86. The tank is also provided with means 88 for putting the contents under pressure. In the present instance these means 88 consist of a valve comparable to the valve of a bicycle tire. In the valve stem 91 secured in position by means of a nut 90, there is inserted the valve body 94 sheathed in a rubber tube 92. 95 denotes the screw cap for securing the valve body 94 in position. The connecting branch or nipple 97 of the valve body is provided with screw threading. After unscrewing the cap 98, a pump, e. g. a bicycle pump, may be connected to the branch 97, and with the aid of this pump air may be put under pressure in the inside of the container 80.

The means used for putting the germinal liquid under pressure in the storage tank may of course be of any other suitable or desired nature, and may be provided at any other part of the tank, e. g. in the closure cap 86.

The described and illustrated devices for carrying out artificial fertilizing and/or infecting of plants in accordance with the invention represent only some of the possible embodiments of the invention, insofar as the apparatus is concerned, by way of example, and the device may be modified in numerous ways without departing from the scope and spirit of the invention as defined in the appended claims. It is possible for example to make the parts of the device to be moved relatively to each other slidable in guides. The control means for governing the flow of the germinal liquid to the pricking means may also be modified in any desired manner. The prime essential is merely that the control means shall be so constructed that germinal liquid can be fed to the pricking means when the moving parts of the device are in a certain position of their range of movement relatively to each other.

I claim:

1. The method of cultivation of ergot in fields on living plants, which consists in injecting into the tissues of plants vaccine liquid containing ergot spores.

2. The method of cultivation of ergot in fields on living plants, which consists in puncturing the plants and introducing vaccine liquid containing ergot spores into the tissues of the plants at the puncture points.

3. The method of cultivation of ergot in fields on living plants, which consists in injecting into the tissues of plants at a plurality of points simultaneously vaccine liquid, containing ergot spores.

4. The method of cultivation of ergot in fields on living plants, which consists in injecting into the tissues of rye plants vaccine liquid containing ergot spores.

5. The method of cultivation of ergot in fields on living plants, which consists in injecting into the tissues of plants vaccine liquid containing coloring matters, for the purpose of rendering recognisable the plants treated.

6. The method of cultivation of ergot in fields on living plants, which consists in injecting into the tissues of plants vaccine liquid containing ergot spores, and, after honey-dew formed on said plants as a result of said injections bringing the treated plants into contact with adjacent plants, thus promoting secondary infection by distributing the honey-dew.

7. The method of cultivation of ergot in fields on living plants, which consists in injecting into the tissues of plants vaccine liquid containing ergot spores and further containing also biochemically active substances to influence the development and the composition of the essential constituents of the ergot.

WALTER HECHT.